United States Patent
Hockley

(10) Patent No.: US 9,632,488 B2
(45) Date of Patent: Apr. 25, 2017

(54) POWER AND COMMUNICATION ASSEMBLY FOR CONNECTION TO REMOTE ELECTRONIC DEVICES

(75) Inventor: Philip Hockley, Cambridgeshire (GB)

(73) Assignee: Comcon Oil Limited (GB)

( * ) Notice: Subject to any disclaimer, the term of this patent is extended or adjusted under 35 U.S.C. 154(b) by 584 days.

(21) Appl. No.: 13/880,492

(22) PCT Filed: Oct. 19, 2011

(86) PCT No.: PCT/GB2011/052025
§ 371 (c)(1),
(2), (4) Date: Apr. 19, 2013

(87) PCT Pub. No.: WO2012/052761
PCT Pub. Date: Apr. 26, 2012

(65) Prior Publication Data
US 2013/0211554 A1    Aug. 15, 2013

(30) Foreign Application Priority Data
Oct. 22, 2010  (GB) .................................. 1017837.4

(51) Int. Cl.
G05B 13/02   (2006.01)
H04B 3/54   (2006.01)

(52) U.S. Cl.
CPC ............. *G05B 13/02* (2013.01); *H04B 3/548* (2013.01); *H04B 2203/5475* (2013.01)

(58) Field of Classification Search
None
See application file for complete search history.

(56) References Cited

U.S. PATENT DOCUMENTS

| 4,926,158 A | 5/1990 | Zeigler |
| 5,081,440 A | 1/1992 | Ott et al. |

(Continued)

FOREIGN PATENT DOCUMENTS

| DE | 44 25 250 C1 | 1/1996 |
| WO | 93/15539 A1 | 8/1993 |

OTHER PUBLICATIONS

Espacenet, English Machine Translation of WO 93/15539 A1, published on Aug. 5, 1993, retrieved from http://worldwide.espacenet.com on Mar. 22, 2013 (7 pages).

(Continued)

*Primary Examiner* — Mohammad Ali
*Assistant Examiner* — Saad M Kabir
(74) *Attorney, Agent, or Firm* — The Kubiak Law Firm PLLC

(57) ABSTRACT

An electronic device for deployment in a remote location such as a well-bore comprises two main device terminals for connection to a remote power supply and communication assembly via two electrical couplings; a power storage arrangement (C1) having two power input terminals; a device communication arrangement having two device communication terminals; a device switching arrangement (S2) for selectively connecting each of the two power input terminals or each of the two device communication terminals to a respective one of the main device terminals; and a device controller for controlling the operation of the switching arrangement. A power supply and communication assembly is also provided and arranged to be coupled to one or more of the devices.

11 Claims, 2 Drawing Sheets

(56) References Cited

U.S. PATENT DOCUMENTS

| | | | |
|---|---|---|---|
| 5,489,809 A | | 2/1996 | Kaya et al. |
| 2002/0043369 A1* | | 4/2002 | Vinegar et al. .......... 166/250.07 |
| 2004/0113756 A1* | | 6/2004 | Mollenkopf ............. 340/310.01 |
| 2006/0290208 A1 | | 12/2006 | Chang et al. |

OTHER PUBLICATIONS

Espacenet, English Machine Translation of DE 44 25 250 C1, published on Jan. 11, 1996, retrieved from http://worldwide.espacenet.com on Mar. 22, 2013 (9 pages).
United Kingdom Intellectual Property Office, Patents Act 1977: Search Report under Section 17, Application No. GB1017837.4, dated Jun. 29, 2011 (1 page).
European Patent Office, International Search Report and Written Opinion of the International Searching Authority, Application No. PCT/GB2011/052025, dated Feb. 29, 2012 (11 pages).
European Patent Office, International Preliminary Report on Patentability, Application No. PCT/GB2011/052025, dated Jan. 25, 2013 (18 pages).

\* cited by examiner

POWER AND COMMUNICATION ASSEMBLY FOR CONNECTION TO REMOTE ELECTRONIC DEVICES

BACKGROUND OF THE INVENTION

In the oil industry, and other similar industries, there is sometimes a requirement to operate equipment at long distances from any existing source of power. This means that both power and communications each have to be arranged by cable or radio links. This can be problematic as long lengths of cable are costly and also can have high resistances leading to high voltage drops, meaning that very high voltages may be required for equipment to function. Communications also suffer due to the resistance of the long wires.

An alternative approach to this is to locally power the device with a battery, but the power output of a battery tends to become impaired due to power leakage and performance decay at high temperatures.

Currently few electrically powered devices are deployed into down-hole environments but the above issues have been addressed in the following ways:
1. High voltages are used to overcome the resistance of the cabling so as to give the down-hole device adequate power;
2. Systems that are only deployed for a short period of time or only operate for "one shot" are powered by on-board batteries, but these systems may degrade in the higher temperature situations.

SUMMARY OF THE INVENTION

The present invention provides an electronic device for deployment in a remote location, comprising:
  two main device terminals for connection to a remote power supply and communication assembly via two electrical couplings;
  a power storage arrangement having two power input terminals;
  a device communication arrangement having two device communication terminals;
  a device switching arrangement for selectively connecting each of the two power input terminals or each of the two device communication terminals to a respective one of the main device terminals; and
  a device controller for controlling the operation of the switching arrangement.

The device is therefore able to receive power for storage in its power storage arrangement, and receive and/or send communication signals for its communication arrangement via electrical couplings used for both functions. This provides several advantages which are discussed below.

Preferably, the power storage arrangement of the device comprises a capacitive power storage arrangement.

The device controller may include a sensor for monitoring the voltage across the main device terminals, with the device controller arranged to cause the switching arrangement to disconnect the power input terminals from the main device terminals when the voltage across the main device terminals falls below a predetermined threshold. In this way, the device is able to detect when the power supply phase of operation has ceased and in response disconnect the power input terminals of the device from the main device terminals.

Preferably, an over-voltage protection arrangement is coupled between the device communication terminals. This avoids damage to the communication circuitry of the device, for example in the loss of synchronisation between the switching arrangement of the device and the associated controller. This may be implemented in the form of a zener diode connected across the device communication terminals for example.

In a preferred application, the device may be adapted for incorporation in a tubing string deployed in a well.

The present invention further provides a power supply and communication assembly having two main assembly terminals for connection to a remote electronic device via two electrical couplings, comprising:
  a power source having two power output terminals;
  an assembly communication arrangement having two assembly communication terminals;
  an assembly switching arrangement for selectively connecting each of the two power output terminals or each of the two assembly communication terminals to a respective one of the main assembly terminals; and
  an assembly controller for controlling the operation of the switching arrangement.

According to another aspect, the invention provides a power supply and communication assembly and an electronic device as defined above in combination, wherein each main assembly terminal is connected to a respective main device terminal via a respective electrical coupling.

The signals sent from the remote device back to the assembly may comprise telemetry data, such as measurements taken by one or more sensors on the device.

The power supply and communication assembly, the remote electronic device, and/or a combination including both the assembly and the device may include a discharge arrangement for discharging charge stored in the electrical couplings extending between the assembly and the device.

Furthermore, a method of operating such a combination is provided, comprising the steps of:
  transferring power from the power source to the power storage arrangement via the electrical couplings;
  switching the assembly and device switching arrangements so that the assembly communication arrangement is connected to the device communication arrangement via the electrical couplings; and
  sending a control signal from the assembly to the device via the electrical couplings.

The method preferably includes a method of discharging charge stored in the electrical couplings after the power transfer step and before the switching step.

The method may also include a step of monitoring the voltage across the main device terminals, and disconnecting the power input terminals from the main device terminals when the voltage across the main device terminals falls below a predetermined threshold.

The main device terminals of the power and communications assembly may be electrically coupled to a plurality of remote electronic devices. The assembly communication arrangement may be configured to transmit a signal via the assembly communication terminals identifying a selected one of the devices to which a subsequent signal from the assembly is allocated.

In this way, a pair of electrical couplings may be employed to address several remote devices. In such an arrangement, it may be appropriate initially to at least partially charge the devices so that on-board electronics can be activated. The assembly may then transmit a signal to the devices which identifies one or more of those devices as about to receive a communication. The assembly switching arrangement then couples its power output terminals to the main assembly terminals and charges further the selected device (or devices). Once this stage has been completed, the assembly then reconnects its communication terminals to the main terminals and then transmits the communication signal to the selected device(s).

Each remote device is configured to switch between its power and communication modes so as to receive either power or instructions from the assembly or transmit a response to the assembly as appropriate during this sequence.

Additionally, the present invention provides a method of operating the assembly in combination with a plurality of the electronic devices, comprising the steps of:

transferring power from the power source to the power storage arrangement of each device via the electrical couplings;

switching the assembly and device switching arrangements so that the assembly communication arrangement is connected to the device communication arrangement of each device via the electrical couplings; and sending a selection signal from the assembly to the devices via the electrical couplings which identifies a selected one of the devices to which a subsequent signal from the assembly is allocated.

The selected device is charged further by the assembly if necessary. It then switches to communication mode to receive one or more commands from the assembly.

BRIEF DESCRIPTION OF THE DRAWINGS

An embodiment of the invention will now be described by way of example with reference to the accompanying drawings, wherein.

DETAILED DESCRIPTION OF THE INVENTION

The invention provides a way of both powering and communicating with an electronic Down Hole Device (referred to as the DHD from here on), which supplies enough energy for the device, whilst potentially using only three wires. This is achieved in the embodiment shown in the Figures by switching between power charging and communication cycles.

Figure 1:
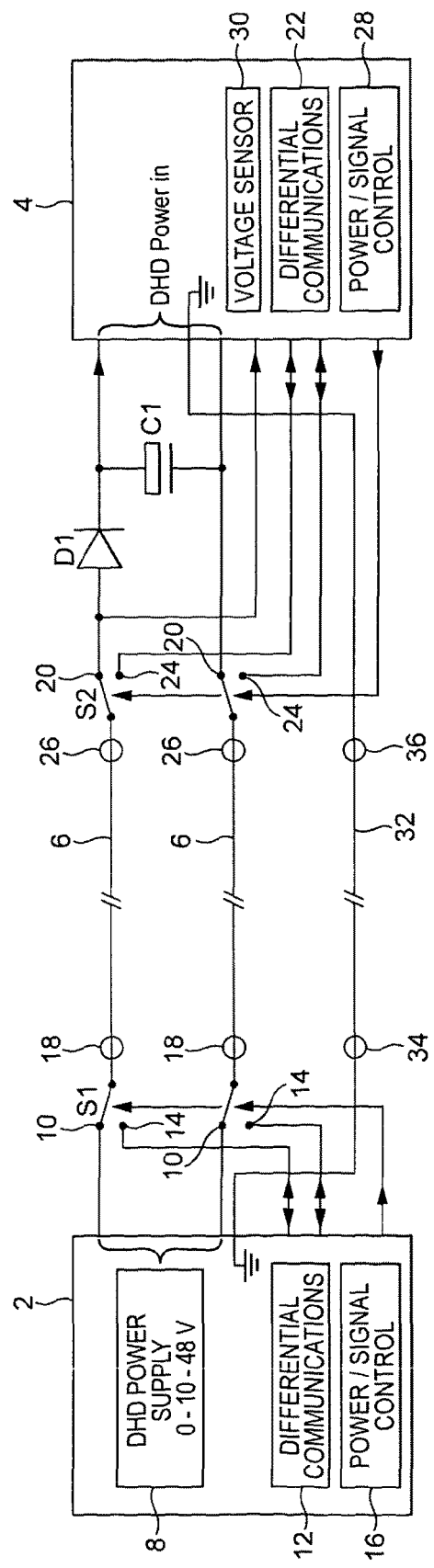
FIG. 1 is a block diagram representing a power supply and communications assembly in combination with a remote electronic device according to an embodiment of the invention.

In FIG. 1, a power supply and communication assembly 2 is located above ground and the DHD 4 is suitable for deployment underground, for example down an oil well. Running between these two arrangements is a pair of connectors or wires 6 forming a surface-to-down-hole cable.

Assembly 2 includes a DHD power supply 8 having two power output terminals 10. It also includes a differential communications arrangement 12 having two associated assembly communication terminals 14. A switch S1 is arranged for selectively coupling either power terminals 10 or communication terminals 14 to wires 6. The operation of switch S1 is governed by a controller 16 within the surface assembly 2. The assembly has two main terminals 18, each of which is coupled to a respective one of the wires 6.

The DHD includes a power storage arrangement in the form of a capacitor (or bank of capacitors) C1. Each side of the capacitor is coupled to a respective power input terminal 20. The DHD also includes a differential communications arrangement 22 coupled to two device communication terminals 24. Two main device terminals 26 of the DHD are each coupled to a respective one of the wires 6.

A switch S2 is configured to selectively connect either the two power input terminals 20 or the pair of communications terminals 24 to the main device terminals 26. The disposition of the switch is controlled by device controller 28. The DHD also includes a voltage sensor 30 for monitoring the voltage applied to the DHD 4 by the surface assembly 2. A diode D1 is electrically coupled between one of the power input terminals 20 and one side of the capacitor bank C1, in such a way as to permit current flow from the terminal towards the capacitor.

A third, earth wire 32 also extends between respective earth terminals 34 and 36 of the assembly 2 and the DHD 4. This ensures that the circuit grounds of the assembly and DHD are at the same potential. This avoids drift of the ground potential of the DHD, which could lead to communication failure.

Figure 2:
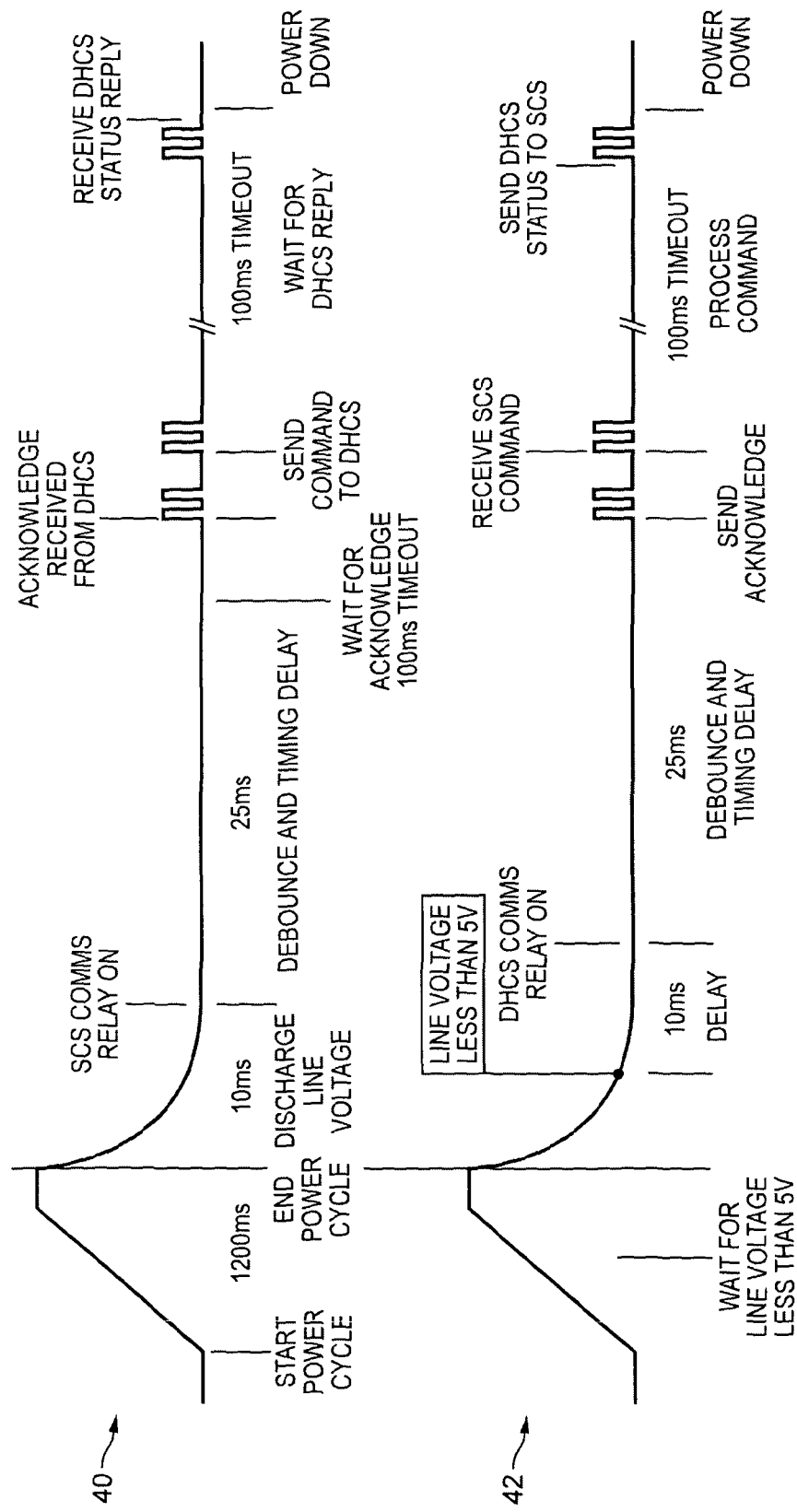
FIG. 2 is a timing diagram to illustrate a sequence of operation of the combination shown in FIG. 1.

In order to synchronise the two systems the timing between them is critical. A timing sequence is shown by way of example in FIG. 2. This sequence will now be described with reference to the Figures. FIG. 2 shows two schematic plots 40 and 42 of voltage over time for the voltage across the main assembly terminals 18 and the device input terminals 26, respectively.

In standby mode, the two switches (S1 and S2) are in the position shown in FIG. 1, and the surface power supply is set to 0V. When the DHD 4 is required to perform a function, the power supply is set to 48V, and the capacitor bank C1 charges up. The DHD then becomes active. Once the power cycle has finished, the power supply voltage is once more set to 0V. At this point the voltage sensor 30 in the DHD detects the loss of power at S2, and switches S2 over to the communication mode. The surface electronics assembly 2 also switches S1 at the same time. This then allows the surface electronics to pass the command to the DHD, and for it to act on the command and then send the relevant data back to the surface electronics. At this point the cycle is complete and both S1 and S2 are switched back to the standby state.

The system must be reliable and if S1 and S2 are relays, it is important to protect them from switching high voltages (this prevents arcing which is the main cause of relay failure). The system achieves this by only switching the relays when the DHD voltage is below a threshold (for example 5V), and limiting the available current during the charging cycle (this prevents large capacitive charging currents from appearing in the cabling).

The power cycle is used to charge up the capacitor (C1) on the DHD. The power supply voltage (the actual voltage will depend on the device's power requirements) is applied via the already closed switches S1 and S2. After a set time (this will depend on the value of C1), the capacitor will be fully charged.

The power supply is now turned off, and any capacitances across the line (mainly decoupling within the surface electronics) are discharged by a discharge resistor (not shown) which is switched across the line, for say 10 ms. Once this discharge time is complete the surface electronics turn on switch S1, connecting the differential communications to the down-hole control system.

The DHD uses this falling voltage to determine when the power cycle has ended, and once detected turns on switch S2 after a delay of for example 10 ms (this allows the surface electronics and DHD to synchronise, by ensuring that the delay is of sufficient time for the line voltage to fall below the DHD threshold before the end of the delay period). The delay on the DHD switch S2 allows the actual capacitance on the surface control system board to vary from zero to 200% of its actual value, without synchronisation failure. This also allows for clock drift in the DHD with temperature and aging.

Now that both switches S1 and S2 are switched to differential communications, there is a de-bounce delay (of say 20-25 ms), to allow the relay contacts to stabilise. The is timing is set so that the surface electronics is ready before the DHD. At this point ("wait for acknowledge") the surface electronics waits for the DHD to send two acknowledge bytes. The first byte performs "surface electronics autobaud" (to compensate for temperature variations in the DHD processor's internal clock), and the second ensures the differential communications are working correctly.

Once the acknowledge signal is received by the surface electronics, communications have been established. If the surface electronics picks up any error at this point it will abort the communication cycle.

In embodiments where there are multiple DHDs coupled to a common above-ground assembly, the sending of an acknowledge signal from the DHDs may be omitted as communications need only be established with a selected DHD.

Once the command has been sent, the surface electronics will wait up to say 100 ms for the reply from the DHD. If within this time no reply has been received, the surface electronics will assume the communications have been lost and abandon the communication cycle. On the DHD sending the reply to the surface electronics, the DHD will go into power-down mode.

Once the communication cycle has ended, both switches S1 and S2 will be turned off, and the differential communications will be isolated from the line.

At this point, capacitor bank C1 will still be charged and the DHD will still be active. The DHD will then turn off all unnecessary power devices, and wait for either a new power cycle to begin, or until capacitor bank C1 has discharged sufficiently for the DHD processor to go into reset.

Advantages of this arrangement include:
1. Low voltages are used so they are not hazardous;
2. Power does not need to be stored for long periods of time so storage device costs can be minimised;
3. Down-hole temperatures can be high causing power storage times to reduce. This approach of a 'charge and use' system gets around this effect;
4. Reducing the number of wires going to the device by using the same wires for both power supply and communication purposes reduces the cost of the wiring;
5. In many applications, the space available to accommodate cabling is restricted. Reducing the number of wires required makes it possible to use larger diameter, lower resistance individual wires than would otherwise be the case, allowing signals to be transmitted over greater distances when required by increasing the diameter of the wires;
6. The large distances that are usual with down-hole devices generally mean that driving devices directly is difficult due to the high voltage drop across the cabling, but the present arrangement overcomes this with its charge and use approach; and
7. Since the DHD is only powered when required, the power dissipated by the DHD can be minimised.

The invention claimed is:

1. In combination, an electronic device for deployment in a remote location and a power supply and communication assembly for connection to the remote electronic device, the electronic device comprising:
    two main device terminals for connection to the remote power supply and communication assembly via two electrical couplings; wherein the electronic device has an initial uncharged configuration;
    a device controller;
    a capacitor having two power input terminals;
    a device communication arrangement having two device communication terminals;
    a device switching arrangement configured to switch between:
    (i) a first configuration in which each of the two power input terminals is connected by the device switching arrangement to the capacitor and the two device communication terminals are disconnected from the main device terminals, and
    (ii) a second configuration in which each of the two device communication terminals is connected by the device switching arrangement to a respective one of the two main device terminals and the two power input terminals are disconnected from the main device terminals, whereby the device communication arrangement is able to begin a communication cycle via the device communication terminals and the two electrical couplings; wherein the capacitor provides power to operate the electronic device in the second configuration; and
    the device controller arranged to switch from the first configuration to the second configuration upon sensing a reduction in voltage from the power supply and communication assembly via the two electrical couplings;
    the device controller arranged to switch from the second configuration to the first configuration upon conclusion of the communication cycle then power down; and
    the power supply and communication assembly having two main assembly terminals for connection to the remote electronic device via the two electrical couplings, the power supply and communication assembly comprising:
    a power source having two power output terminals;
    an assembly communication arrangement having two assembly communication terminals;
    an assembly switching arrangement configured to switch between:
    (i) a first configuration in which each of the two power output terminals is connected by the assembly switching arrangement to a respective one of the two main assembly terminals and the assembly communication terminals are disconnected from the main assembly terminals, and
    (ii) a second configuration in which each of the two assembly communication terminals is connected by the assembly switching arrangement to a respective one of the two main assembly terminals and the power output terminals are disconnected from the main assembly terminals; and an assembly controller arranged to control the operation of the switching arrangement.

2. The combination of claim 1, wherein each main assembly terminal is connected to a respective main device terminal via a respective electrical coupling.

3. The combination of claim 1 including a discharge arrangement for discharging charge stored in said electrical couplings.

4. The combination of claim 1, wherein:
the capacitor is connected via the electrical couplings; wherein the assembly and electronic device switching arrangements are connected to the device communication arrangement via the electrical couplings; and further wherein a control signal is sent from the assembly to the device via the electrical couplings.

5. The combination of claim 4, wherein the capacitor is discharged after the capacitor is connected and before the switching step.

6. The combination of claim 4, wherein the voltage across the main device terminals is monitored and the capacitor is disconnected from the main device terminals when the voltage across the main device terminals falls below a predetermined threshold.

7. In combination, a plurality of electronic devices for deployment in a remote location and a power supply and communication assembly for connection to the plurality of electronic devices, each electronic device comprising:
two main device terminals for connection to the remote power supply and communication assembly via two electrical couplings; wherein the electronic device has an initial uncharged configuration;
a device controller;
a capacitor having two power input terminals;
a device communication arrangement having two device communication terminals;
a device switching arrangement configured to switch between:
(i) a first configuration in which each of the two power input terminals is connected by the device switching arrangement to the capacitor and the two device communication terminals are disconnected from the main device terminals, and
(ii) a second configuration in which each of the two device communication terminals is connected by the device switching arrangement to a respective one of the two main device terminals and the two power input terminals are disconnected from the main device terminals, whereby the device communication arrangement is able begin a communication cycle via the device communication terminals and the two electrical couplings; wherein the capacitor provides power to operate the device communication arrangement and the device switching arrangement; and
the device controller arranged to switch from the first configuration to the second configuration upon sensing a reduction in voltage from the power supply and communication assembly via the two electrical couplings;
the device controller arranged to switch from the second configuration to the first configuration upon conclusion of the communication cycle then power down; and
the power supply and communication assembly having two main assembly terminals for connection to the plurality of remote electronic devices via two electrical couplings, the power supply and communication assembly comprising:
a power source having two power output terminals;
an assembly communication arrangement having two assembly communication terminals;
an assembly switching arrangement configured to switch between:
(i) a first configuration in which each of the two power output terminals is connected by the assembly switching arrangement to a respective one of the two main assembly terminals and the assembly communication terminals are disconnected from the main assembly terminals, and
(ii) a second configuration in which each of the two assembly communication terminals is connected by the assembly switching arrangement to a respective one of the two main assembly terminals and the power output terminals are disconnected from the main assembly terminals; and
an assembly controller arranged to control the operation of the switching arrangement.

8. The combination of claim 7, wherein one main assembly terminal is connected to one main device terminal of each device via one coupling, and the other main assembly terminal is connected to the other main device terminal of each device via the other coupling.

9. The combination of claim 7, wherein power from the power source to the capacitor via the electrical couplings is transferred;
wherein the assembly and device switching arrangements are switched so that the assembly communication arrangement is connected to the device communication arrangement of each device via the electrical couplings; and further wherein a selection signal is sent from the assembly to the devices via the electrical couplings which identifies a selected one of the devices to which a subsequent signal from the assembly is allocated.

10. A combination of claim 7 including a discharge arrangement for discharging charge stored in said electrical couplings.

11. The combination of claim 7, wherein the voltage across the main device terminals is monitored and the capacitor is disconnected from the main device terminals when the voltage across the main device terminals falls below a predetermined threshold.

* * * * *